Aug. 31, 1965   G. W. BLATCHFORD   3,203,563
LOAD-SUPPORTING BUNKS FOR VEHICLES
Filed Nov. 26, 1962   3 Sheets-Sheet 1
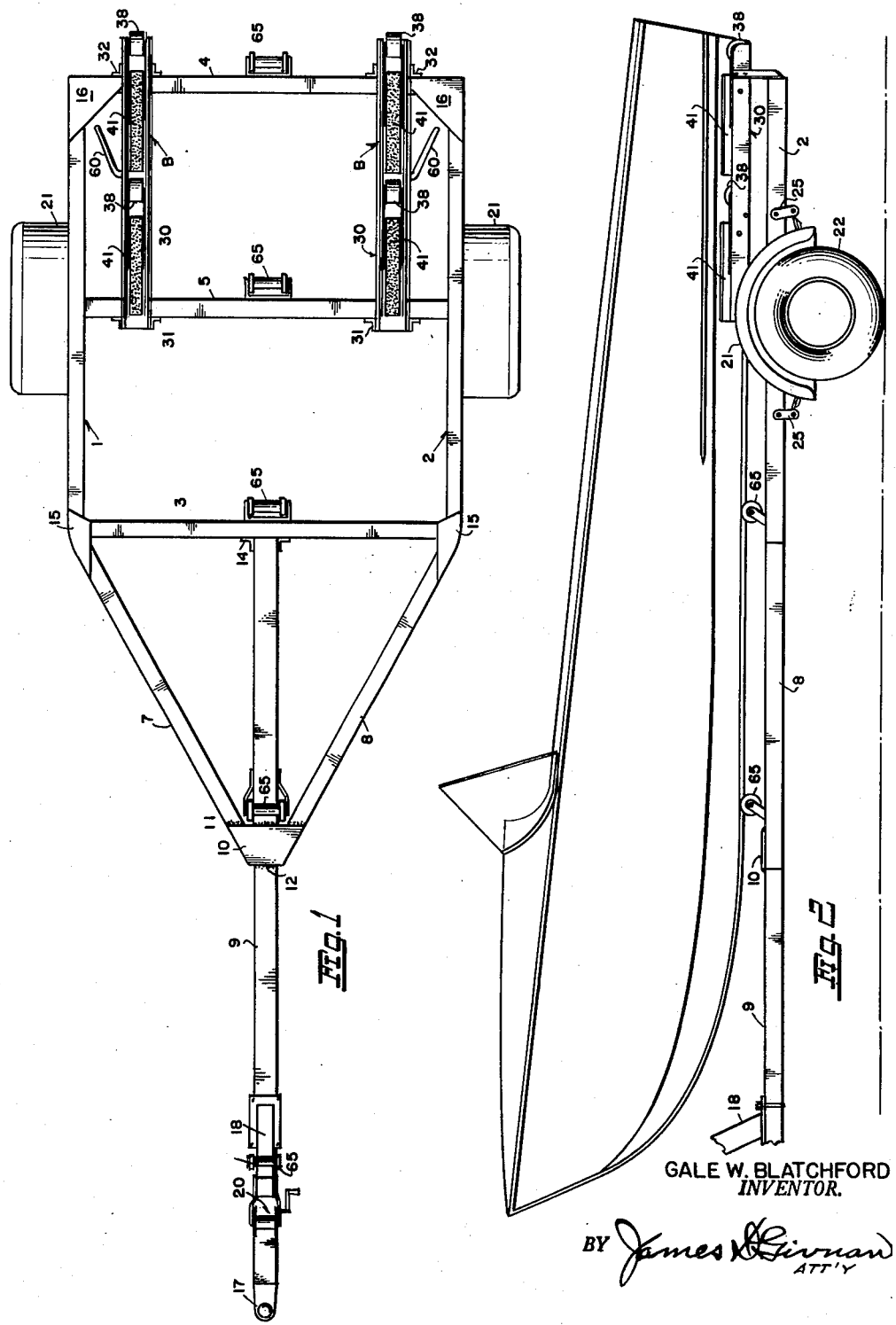
GALE W. BLATCHFORD
INVENTOR.
BY James L. Girvan
ATT'Y

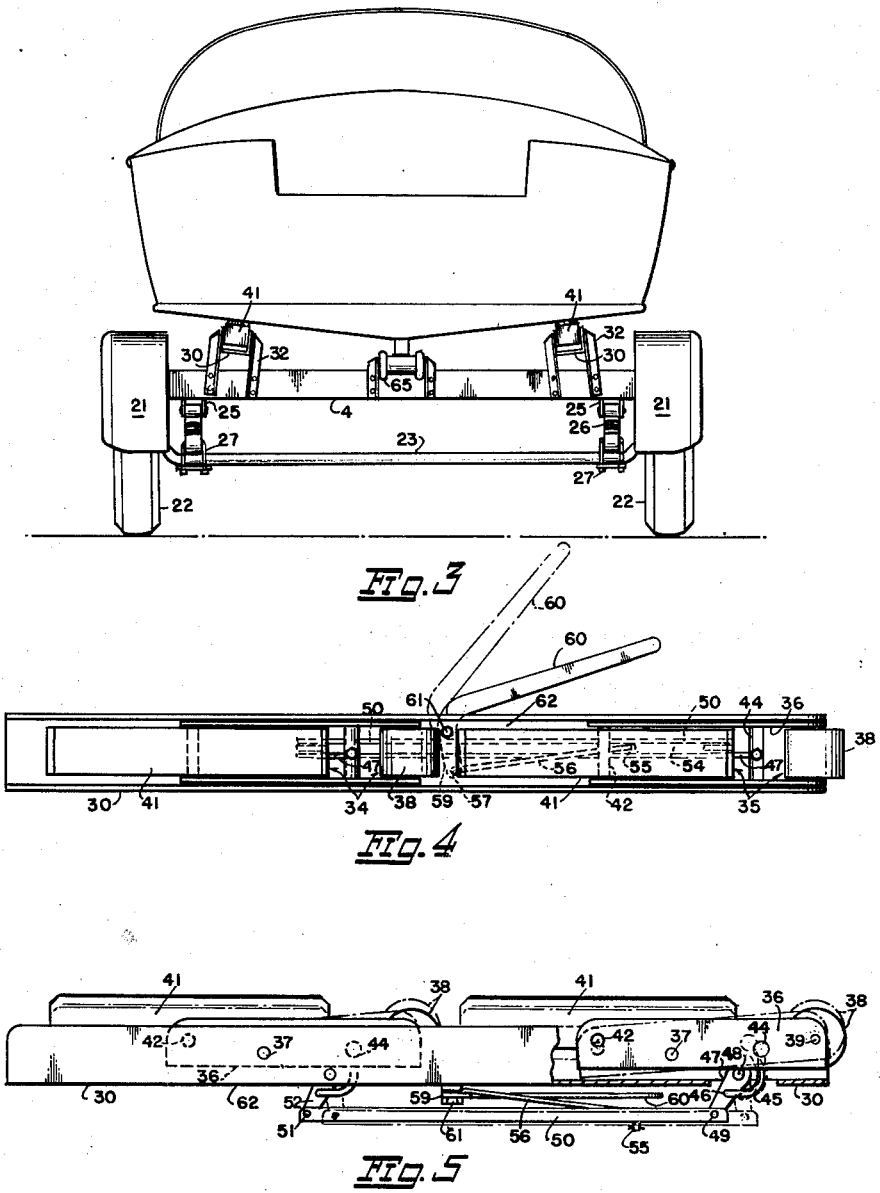

Aug. 31, 1965

G. W. BLATCHFORD 3,203,563

LOAD-SUPPORTING BUNKS FOR VEHICLES

Filed Nov. 26, 1962

GALE W. BLATCHFORD
INVENTOR.

BY James X. Girman
ATT'Y

United States Patent Office 3,203,563
Patented Aug. 31, 1965

3,203,563
LOAD-SUPPORTING BUNKS FOR VEHICLES
Gale W. Blatchford, Molalla, Oreg.
Filed Nov. 26, 1962, Ser. No. 240,002
5 Claims. (Cl. 214—84)

This invention relates generally to means for facilitating the loading and unloading of vehicles of various kinds and for anchoring the load to the vehicle while in transit.

More particularly the invention relates to such means for use, though not restrictively, with boat trailers, freight trucks, cargo pallets and similar carriers.

One of the principal objects of the invention is the provision of means of the character described which includes spaced apart parellel load-supporting bunks, each provided with a series of rollers rotatable about axes movable in a vertical plane and cooperating series of elongated load-supporting pads movable simultaneously in a vertical plane relative and opposite to the movement of the rollers whereby a load may be transferred from its anchored position upon the pads to the rollers for easy removal from the load carrying vehicle.

Another object is the provision of means for actuating the series of pads and rollers in both bunks simultaneously.

A further object of the invention is the provision of boat bunks so arranged on a boat trailer to provide full and well balanced support for a boat, rendering the trailer easy to handle, balanced so that it trails smoothly and designed for easy loading and launching.

A still further object is the provision of hull-supporting bunk units which can be operatively interconnected axially along both sides of the trailer to accommodate boats of the inboard class.

The foregoing and other objects and advantages which will become subsequently apparent reside in the details of construction and operation as more fully hereinafter described and claimed, reference being had to the accompanying drawings forming a part hereof and in which:

FIGURE 1 is a top plan view of a boat trailer showing hull-supporting bunks, made in accordance with my invention, installed upon the trailer chassis.

FIGURE 2 is a side elevational view of FIGURE 1 with a boat fixedly supported upon the bunks and keel rollers, and with a fragment of the forward end of the trailer broken away.

FIGURE 3 is a rear elevational view of FIGURE 2.

FIGURE 4 is a top plan view on an enlarged scale of the right hand or upper bunk shown in FIGURE 1 which is identical with the left hand or lower bunk shown therein except for the disposition of their respective actuating levers.

FIGURE 5 is a side elevational view of FIGURE 4 with a fragment broken away to reveal internal parts.

Figure 6:
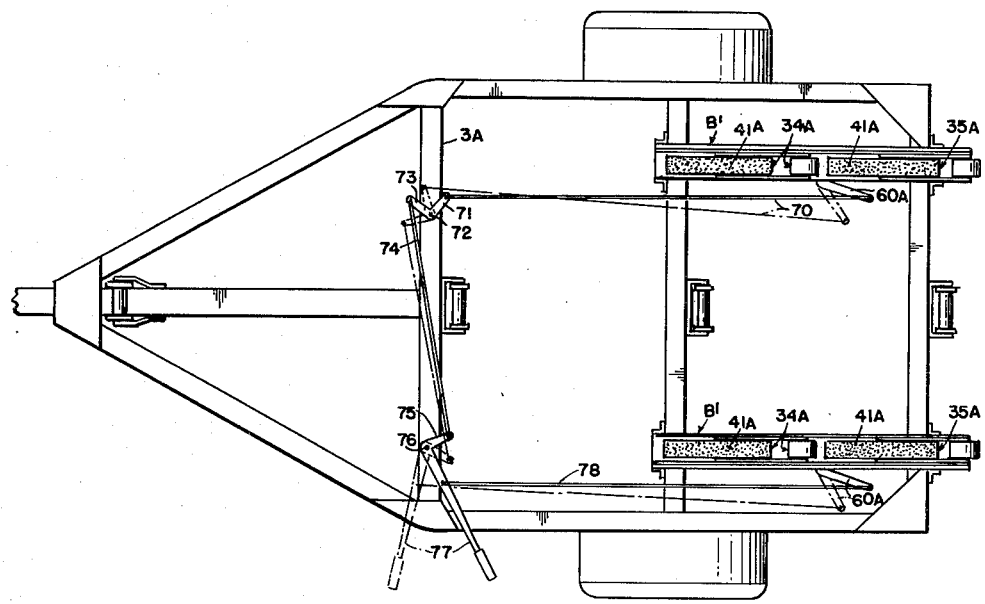
FIGURE 6 is a fragmentary view similar to FIGURE 1 showing means for simultaneously actuating both bunks.

With continuing reference to the drawings, wherein like references of character designate like parts and particularly FIGURES 1 to 3 thereof, the trailer shown therein is exemplary of any of the various types now available on the open market and comprises a chassis made up of two longitudinal members 1 and 2 interconnected by forward and rearward cross members 3 and 4 and an intermediate cross member 5. The forward end of the frame members 1 and 2 converge as at 7 and 8 to a tongue or draw bar 9 and are rigidly secured thereto by means of a plate 10 secured to the members 7 and 8 and to the tongue 9 by any suitable means such as by welding 11 and 12 or by bolts, not shown.

The rearward end of the tongue 9 is rigidly secured by any suitable means, such as angle clips 14 or the like, to the forward cross member 3. The rigid structural assembly thus far described may be further reinforced by forward and rearward gusset plates 15 and 16.

The foremost end of the tongue 9 is provided with any suitable trailer-hitch indicated at 17 and rearwardly thereof with an upwardly and forwardly inclined stand 18 for any suitable type of winch indicated generally at 20.

The trailer chassis is provided near its rearward end with fenders 21 bolted or otherwise secured to the longitudinal members 1 and 2 to cover ground-engaging wheels 22 rotatably mounted upon a fixed axle 23 (see FIG. 3) suspended from the longitudinal members 1 and 2 by spring shackles 25 and cantilever springs 26 secured to the axle by any suitable means such for instance, as shackle bolts 27.

Two hull-supporting bunks indicated generally at B are secured to the trailer chassis in parallel spaced relation, as shown, and since they are identical, except for the disposition of their actuating levers, a description of one will suffice for both.

As clearly illustrated in FIGURES 4 and 5, each bunk comprises a main body made of channel section 30 fixedly secured at or near its forward and rearward ends to the chassis cross members 5 and 4 (FIGS. 1 and 3) by means of supporting angles 31 and 32, respectively, and inclined inwardly so that their hull-supporting instrumentalities substantially match the contour of the bottom of a boat hull.

Each channel 30 carries pad and roller units indicated generally at 34 and 35, or the channels may be of greater length to accommodate more than two pad-roller units if desired to handle boats with inboard engines and of greater length than outboard runabouts and the like.

Each of said pad roller units comprises a relatively short channel section 36 disposed within and pivotally attached to the flanges of the main channel 30 by means of a pivot pin 37 and may be hereinafter sometimes referred to as a "rocker channel." The pin 37 (FIG. 5) is offset forwardly from the center of the rocker channel and extends through the flanges of the rocker channel and those of the main channel 30.

The rearward end of each rocker channel is provided with a roller 38 rotatably mounted on a shaft 39 extending through the flanges of the rocker channel. Rockably supported within each rocker channel 36 at the forward end thereof is bunk pad 41, so supported by means of a pivot pin 42 extending transversely through the center of the pad and into the flanges of the rocker channel.

A cross shaft 44 is secured to the flanges of the rocker channel 36 and integrated with a downwardly and forwardly extending link 45 pivotally attached as at 46 to a lever 47 whose top end is pivotally mounted by a pin 48 extending through the flanges of the channel 30 and whose bottom end is pivotally attached as at 49 to the rearward end of a horizontal link or tie rod 50 whose forward end is similarly attached as at 51 to the lever 52 of the forward pad-roller unit 34.

The link 50 is of channel section as shown in dotted lines in FIGURE 4 and to the web 54 of this channel is pivotally attached as at 55 one end of an actuating link 56 whose opposite end is pivotally attached as at 57 to the end of one arm 59 of a bell crank whose other arm 60 comprises the actuating lever above referred to. The bell crank is pivotally attached as at 61 to the underside of the web 62 of the channel 30. The lever arm 60 may be of any desired length to obtain optimum lever advantages in actuating the pad-roller units under maximum load conditions. The bunks 30 may be mounted in any suitable manner for precise adjustment to the boat hull or transom.

From the foregoing it will be readily apparent that with the lever arm 60 and its related parts in the full line position shown in FIGURES 4 and 5, the bunk pads 41 will be in an elevated boat hull-conforming and supporting position in a lowered position with the keel of the boat resting upon keel rollers 65 as shown in FIGURE 2. The keel rollers are rotatably mounted upon the structural members of the trailer chassis in any conventional manner as shown in FIGURES 1 and 3, or so mounted as to be adjustable to the exact keel contour of any particular boat. It will also be understood that the pads 41, because they are freely rockable fore and aft about their respective pivot pins 42, will be self-conforming to the fore and aft contour of the bottom of a boat hull being dealt with.

A boat hull supported upon the bunk pads 41 which may be covered with rubber or other suitable gripping material, will be held against fore and aft displacement relative to the trailer chassis and further held against rearward displacement by a cable or bow line (not shown) secured to the bow of the boat and coiled about the winch 20.

To transfer the load of the boat hull from the pads 41 onto the rollers 38 it is merely necessary to swing the lever arm 60 of each bunk forwardly into the broken line position shown in FIGURE 4 which, through the medium of the other arm 59, links 56 and 50, levers 47, and links 45, will rock the rocker channels 36 about their respective pivot pins 37 into the broken line position shown in FIGURE 5 to lower the bunk pads 41 and hence the hull until the load of the hull is picked up by the now upwardly swung rollers 38. Thereafter the boat hull may be conveniently rolled rearwardly off the trailer at a launching site or any other terminal location. As clearly shown in FIGURES 4 and 5, the rocker channels 36, pads 41, and rollers 38 are at all times, throughout their operative range, disposed within the confines of the side walls or flanges of the channel sections 30 and thus protected against lateral forces of load sway.

In the modified form of the invention illustrated in FIGURE 6, the bunks B' and their respective pad-roller units 34A–35A and related actuating parts are the same as those shown and described in connection with FIGURES 4 and 5.

To accomplish simultaneous operation of the pad-roller units in both bunks, the lever arm 60A of the right hand bunk is connected to a pull-push rod 70 whose opposite end is connected to one arm 71 of a bell crank pivotally mounted on the trailer chassis cross member 3A as at 72, and whose opposite arm 73 is connected by a link 74 to one arm of a second bell crank 75 similarly attached as at 76 to the trailer cross member and whose opposite arm constitutes an actuating lever 77 connected by a second pull-push rod 78 to the actuating lever arm 60A of the other or left hand boat bunk B'.

With the actuating lever 77 and lever arms 60A in the full line position shown in FIGURE 6, the boat hull will be supported upon the bunk pads 41A now in an elevated position. When the lever arm 77 and its related parts are moved to the broken line poistion, the actuating levers 60A will be moved into their broken line positions to accomplish, in the same manner as the parts in FIGURE 5, the lowering of the pads 41A for the transferring of the load of the boat hull onto the now upswung rollers 38A.

Figure 7:
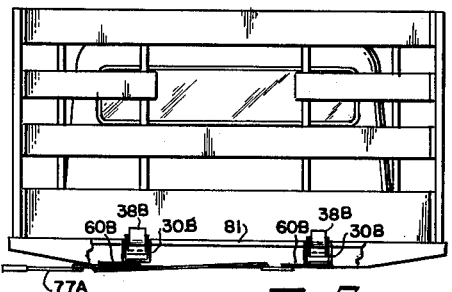
FIGURE 7 is a rear elevational view of a modified form of the invention showing it operatively installed on a truck bed and with a fragment of the truck bed broken away.

In the adaptation of the invention to a truck body, as shown in FIGURE 7, the channel members 30B are secured in any suitable manner to the truck bed 81 with the pad-roller units being operatively disposed above the level of the truck bed so that a load may be conveniently moved forwardly onto and into the truck body and then held in place by the bunk pads when in an elevated position. For selectively manipulating the pads and the rollers 38B into their respective operative positions the levers 60B of each bunk are interconnected to an actuating lever 77A, as in FIGURE 6, so that movement of the lever in one direction will raise the rollers and lower the pads, and in the opposite direction raise the pads and lower the rollers.

Figures 9, 10:
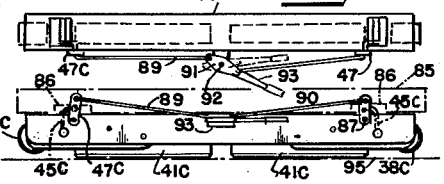
FIGURE 9 is a side elevational view of one of the two identical members of the pallet undercarriage with the pallet platform shown in broken lines.
FIGURE 10 is a top plan view of the undercarriage member shown in FIGURE 9.
Figure 8:
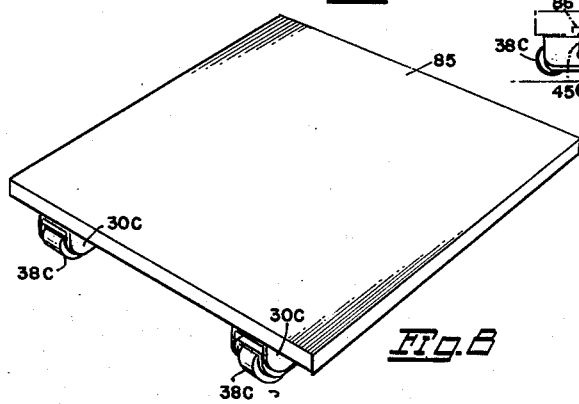
FIGURE 8 is a perspective view of a further modified form of the invention applied to a cargo pallet as the under carriage thereof.

In the further modification shown in FIGURES 8–10 the bunk channels 30C are secured in any suitable manner, in an inverted position, to the underside of a cargo pallet platform 85 which is relieved or recessed as at 86 on its underside to accommodate links 45C connected at their top ends to levers 47C which are pivotally mounted as at 87 to the flanges of the channel 30C. The top end of the levers 47C are connected by links 89 and 90 to a two-way lever 91 pivotally mounted as at 92 to a supporting lug 93 welded to the outside flange of each channel member. The lever 91 is extended into a handle 93 for convenience in raising and lowering the pads and rollers relative to each other and to the flooring or other pallet-supporting surface 95. With the rollers 38C in a down position a loaded pallet may be easily rolled to any desired location and then anchored against displacement by raising the rollers and lowering the pads 41C into floor engaging position as shown in full lines in FIGURE 9.

It will be readily understood that in all forms of the invention herein shown and described the pads will be automatically locked in their respective elevated load-supporting positions, as will the rollers, through the medium of the over-center relationship of the linkage between the pad and roller rocker channels, their actuating levers, and the pivotal connection of the latter to the linkage between the levers. Similarly the same locking function is performed through the same relationship of the pivot point of the manually operable lever in the form of a bell crank, the pivotal connections of the actuating linkage interconnecting the actuating levers of the pad and roller rocker channels.

While I have shown particular forms of embodiment of my invention, I am aware that many minor changes therein will readily suggest themselves to others skilled in the art without departing from the spirit and scope of the invention. Having thus described my invention what I claim as new and desire to protect by Letters Patent is:

1. A load-carrying vehicle comprising,
a wheel-supported body,
stationary load-supporting bunks,
each of said bunks comprising a length of channel section,
means fixedly securing said channel sections to said body in parallel relation to each other,
at least one rocker channel within each of said channel sections,
means rockably mounting said rocker channels within their respective channel sections,
said mounting means offset forwardly from the center of each rocker channel,
a load-supporting pad carried by each of said rocker channels at one end thereof,
a load-supporting roller carried by the opposite end of each of said rocker channels,
an actuating lever for each of said rocker channels,
means swingably attaching said levers to their respective channel sections,
means interconnecting said actuating levers with said rocker channels for rocking said rocker channels to alternately move their respective load-supporting pads and rollers into load-supporting positions, whereby the transfer of the load from said pads to said rollers will facilitate removing the load from the vehicle body.

2. A load-carrying vehicle as claimed in claim 1 including means interconnecting said actuating levers for simultaneously rocking said rocker channels to alternately move their respective load-supporting pads and rollers into load-supporting positions, whereby the transfer of the load from said pads to said rollers will facilitate removing the load from the vehicle body.

3. A load-carrying vehicle comprising,
a wheel-supported body,
load-supporting bunks,
each of said bunks comprising a length of channel sections,
means securing said channel sections to said body in parallel inwardly tilted spaced relation to each other,
forwardly and rearwardly aligned rocker channels disposed within said channel sections,
means rockably mounting said rocker channels within their respective channel sections,
a self-leveling load-supporting pad carried by each of said rocker channels at one end thereof,
a load-supporting roller carried by the opposite end of each of said rocker channels,
actuating levers,
means swingably attaching said levers to said channel sections,
means interconnecting said actuating levers with said rocker channels for rocking said rocker channels to alternately move their respective load-supporting pads and rollers into load-supporting positions, whereby the transfer of the load from said pads to said rollers will facilitate removing the load from the vehicle body.

4. A load carrying vehicle comprising,
a wheel-supported body,
load-supporting parallel bunks carried by said body,
each of said bunks comprising a length of upwardly opening channel sections having vertical flanges,
at least one rocker channel disposed within and protected by each channel section,
means rockably mounting said rocker channels within their respective fixedly mounted channel sections,
said mounting means offset forwardly from the center of each rocker channel,
a load-supporting pad for each of said rocker channels and means rockably mounting said pads within one end of their respective rocker channels,
a load-supporting roller carried by the opposite end of each of said rocker channels,
actuating levers for said rocker channels,
means interconnecting said levers with the rocker channels for rocking the same to alternately move their respective pads or rollers into load-supporting positions within the lateral protective confines of said channel sections.

5. In a boat trailer including a wheel-supported body having a forward end, a rearward end and boat-keel supporting rollers rotatably mounted at spaced-apart intervals lengthwise of the vehicle body along the center line thereof; the improvement comprising two load-supporting bunks disposed one on each side of the vehicle body,
each of said bunks comprising a length of channel section,
means permanently securing said channel sections to said vehicle body in parallel inwardly tilted spaced relation to each other,
at least one rocker channel within each of said bunk channels,
means rockably mounting said rocker channels within their respective bunk channels,
said mounting means offset forwardly from the center of each rocker channel,
a load-supporting pad carried by each of said rocker channels,
means pivotally mounting each of said pads at the forward end of its respective rocker channel for free fore and aft rocking motion relative to and independent of the rocking motion of said rocker channel,
a load-supporting roller carried by the opposite end of each of said rocker channels whereby rocking motion of the rocker channels about their respective rockable mountings will alternately swing said pad and roller upwardly and downwardly relative to said bunk channels.

References Cited by the Examiner
UNITED STATES PATENTS

| 2,865,522 | 12/58 | Peterson et al. | 214—84 |
| 2,901,138 | 8/59 | Whalen | 214—506 |
| 3,063,533 | 11/62 | Cook | 214—84 X |
| 3,080,196 | 3/63 | Darby | 298—24 X |
| 3,104,770 | 9/63 | Calkins et al. | 214—84 |
| 3,120,317 | 2/64 | Pardonnet | 214—84 X |

HUGO O. SCHULZ, *Primary Examiner.*
GERALD M. FORLENZA, *Examiner.*